(12) United States Patent
Smith

(10) Patent No.: US 6,771,894 B2
(45) Date of Patent: Aug. 3, 2004

(54) MOTOR CONTROL RESOLUTION ENHANCEMENT

(75) Inventor: Thomas E. Smith, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 466 days.

(21) Appl. No.: 09/746,203

(22) Filed: Dec. 21, 2000

(65) Prior Publication Data

US 2001/0043288 A1 Nov. 22, 2001

Related U.S. Application Data

(60) Provisional application No. 60/173,234, filed on Dec. 28, 1999.

(51) Int. Cl.[7] .............................................. H02P 5/165
(52) U.S. Cl. ..................................................... 388/809
(58) Field of Search ............................. 318/798, 799, 318/806; 388/809

(56) References Cited

U.S. PATENT DOCUMENTS 5,347,361 A * 9/1994 Kay ........................... 356/475
5,432,693 A * 7/1995 Anderson .................... 363/41

* cited by examiner

*Primary Examiner*—Jeffrey W Donels
(74) *Attorney, Agent, or Firm*—Charles A. Brill; Wade James Brady, III; Frederick J. Telecky, Jr.

(57) ABSTRACT

A motor speed resolution enhancement method and system. A display system controller (202) measures the frame rate of an incoming signal to determine the desired color wheel speed. A digital speed control word (212) representing the desired color wheel speed is written to the motor control circuit (204). The motor control circuit uses the digital speed control word (212) to generate analog control voltages (214) that drive the motor (206). The motor controller (204) also detects the position of the motor and generates a series of commutation interrupts (216). The display system controller 202 accurately measures the input signal's frame rate to determine the proper rate at which to spin the color wheel. The resulting desired speed word has a higher resolution than the motor control circuit (204) is able to receive. The disclosed invention provides a method of increasing the resolution of the digital speed control word (212) without upgrading the resolution of the motor control circuit (204). The disclosed invention uses feedback signals from the motor control circuit (204) that occur several times each revolution to force an update of the digital speed control word (212). The periodically updated digital speed control word (212) is dithered so that the average digital speed control word value represents the desired speed of the motor.

16 Claims, 1 Drawing Sheet

US 6,771,894 B2

MOTOR CONTROL RESOLUTION ENHANCEMENT

This application claims priority under 35 USC §119(e)(1) of provisional application No. 60/173,234 filed Dec. 28, 1999.

FIELD OF THE INVENTION

This invention relates to the field of motor speed control systems, particularly to systems that control the motor of a color wheel in a display system.

BACKGROUND OF THE INVENTION

Many projection display systems use a single light modulator in combination with a white light source to produce a full color image. In order to produce a full color image, the white light source is filtered sequentially to produce a primary colored light beam that changes over time. Typically, a color wheel is used to allow a series of primary colored filters to be spun through the white light beam in rapid succession. As each filter passes through the light beam, the light beam becomes a primary color beam with the active primary color determined by the which portion of the color wheel is passing through the optical path.

During each primary color period, data for the appropriate color is provided to a spatial light modulator to enable the modulator to create a series of single color images. If the single color images are created in a rapid sequence, the viewer's eye integrates the series of images to give the perception of viewing a single full-color image.

Because the data that must be written to the modulator depends on the position of the color wheel, the position of the color wheel is tightly controlled to synchronize the color wheel with the remainder of the display system. The transition period between adjacent color filters—typically called a spoke period—requires turning the modulator off to ensure only pure primary colored light is used to create each of the three primary colored image. Uncertainties and errors in the position or speed of the color wheel force the display system controller to lengthen the spoke periods to ensure only primary colored light is incident the modulator at the appropriate time. Unfortunately, the accumulated off time associated with the lengthened spoke periods creates a substantial drop in projector efficiency.

An accurate and efficient method and system for controlling the color wheel is needed so that the duration of each spoke period can be kept to a minimum and the efficiency of the display system will be increased.

SUMMARY OF THE INVENTION

Objects and advantages will be obvious, and will in part appear hereinafter and will be accomplished by the present invention that provides a method and system for increasing the resolution of a motor control circuit. According to one embodiment of the disclosed invention, a motor controller for controlling the speed of a motor is provided. The motor controller is comprised of a motor control circuit electrically connected to the motor for receiving a digital speed control word representing a desired motor speed and driving the motor, a controller connected to the motor control circuit for providing the digital speed control word to the motor control circuit, the controller dithering the digital speed control word at least twice each revolution of the motor.

Another embodiment of the disclosed invention provides a display system comprising a light source for producing a beam of white light along a first light path, a filter wheel on the first light path for filtering the beam of white light, a motor connected to the filter wheel for spinning the filter wheel, a motor control circuit electrically connected to the motor for receiving a digital speed control word and driving the motor, a spatial light modulator on the first light path for receiving and selectively modulating the filtered beam of light traveling along the first path to form an image, and a controller for providing image data to the spatial light modulator and the digital speed control word to the motor control circuit. The digital speed control word is dithered at least twice each revolution of the motor. The digital speed control word typically is dithered each time the controller receives a commutation interrupt form the motor control circuit.

The disclosed invention provides the technical advantage of increasing the effective resolution of the motor controller speed command word. This in turn increases the accuracy of the control loop as well as the frequency and phase stability of the motor control loop. The increased resolution is obtained at no additional hardware cost through relatively simple software control and uses minimal microcontroller resources.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE PREFERRED EMBODIMENTS

A new method and system for controlling a motor has been developed that improves the accuracy of the motor speed command. The method relies on a standard motor speed control integrated circuit and uses an output signal from the speed control to dither the speed command. The dithered speed command changes the commanded speed of the motor several times each motor revolution. Since the motor cannot change speed at the rate the speed command is dithered, the motor and load act as a low pass filter to smooth the motor speed resulting in the motor speed being the average of the dithered speed commands.

Figure 1:
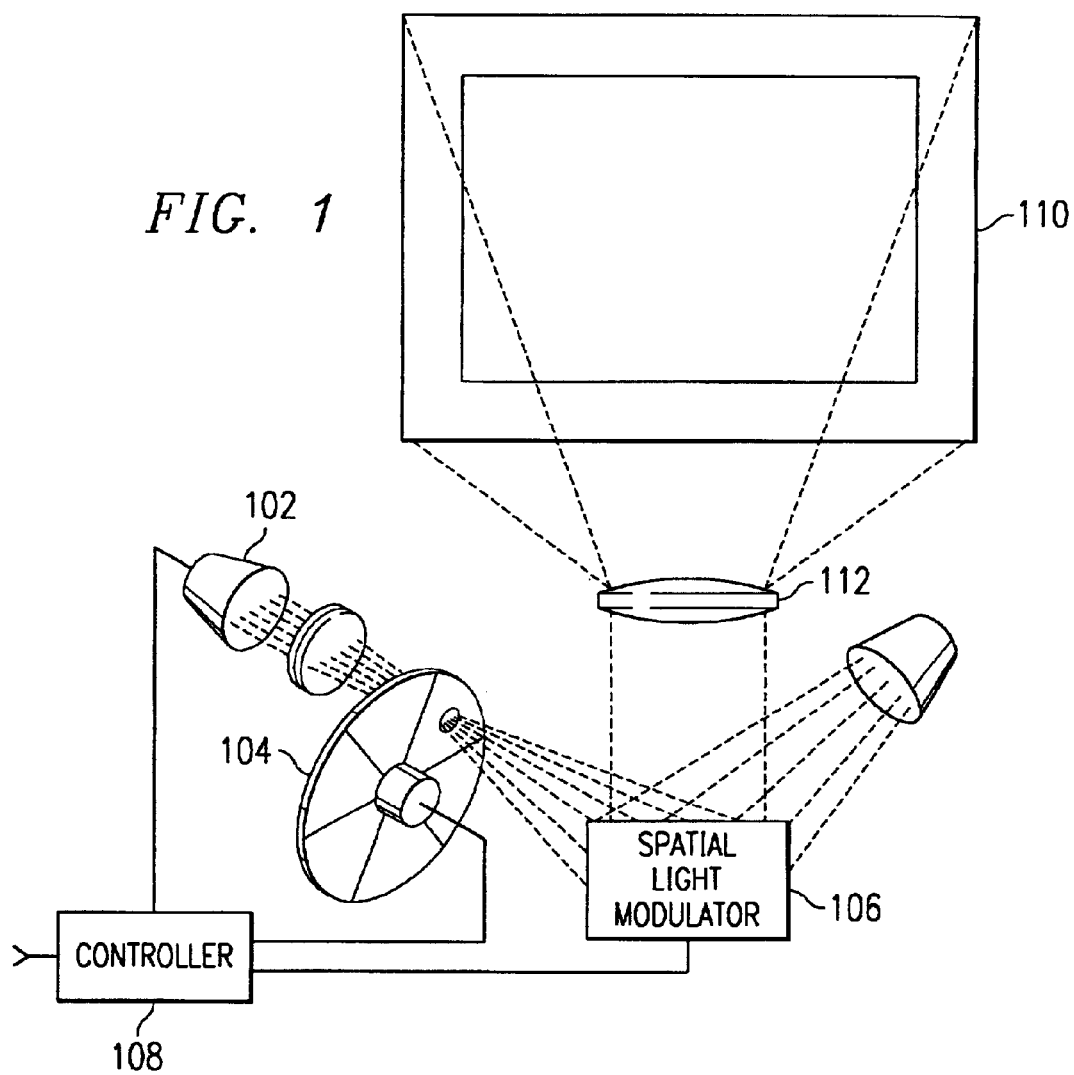
FIG. 1 is a perspective view of a display system using the disclosed motor control resolution enhancement.

FIG. 1 is a perspective view of a sequential color display system 100. In the display system 100 of FIG. 1, light from source 102 is focused onto a spinning color wheel 104. The spinning color wheel 104 creates of beam of light that changes from one primary color to the next in rapid sequence. The primary colored beam of light impinges a spatial light modulator 106, in this case a DMD.

A controller 108 receives a video signal and sends image data to the spatial light modulator 106 in synchronization with the color wheel 104. Image data representing the red portions of the image is sent during the period in which the red color filter is passing through the beam of light. The modulated red beam of light is focused onto an image plane 110 by projection lens 112 to form a red image. The process repeats as the green and blue filters pass through the path of the light beam. The eye of the viewer integrates the three primary color images giving the perception of a single full-color image.

Figure 2:
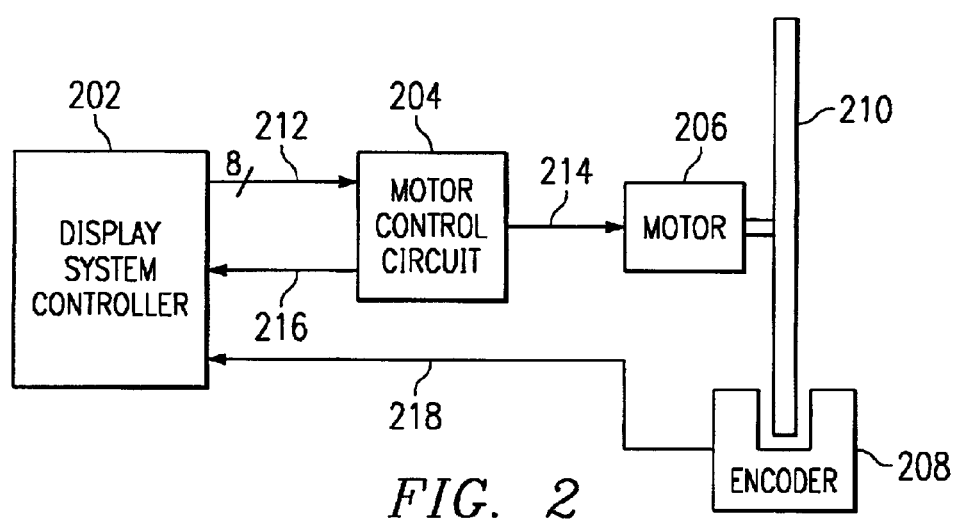
FIG. 2 is a block diagram of a motor control circuit for implementing the disclosed motor control resolution enhancement.

In order to accomplish the synchronization between the color wheel 104 and the image data, the display system controller 108 provides the motor spinning the color wheel 104 with speed commands and receives positional information from the color wheel 104. FIG. 2 is a schematic view of a portion of the display system showing the relationship between the portions of the display system controlling the position of the color wheel 210.

The display system controller 202 measures the frame rate of an incoming signal to determine the desired color wheel speed. A digital speed control word 212 representing the desired color wheel speed is written to the motor control circuit 204. The motor control circuit uses the digital speed control word 212 to generate analog control voltages 214 that drive the motor 206. The motor controller 204 also detects the position of the motor and generates a series of commutation interrupts 216. An optional position sensor 208 detects either the position of the motor 206 or the position of the color wheel 210 driven by the motor 206 and drives a position indicator index signal 218 to the display system controller 202.

Prior art systems use the index signal 218 as an interrupt to cause the display system controller to update the digital speed control word 212. When greater accuracy is needed, the display systems of the prior art attempt to increase the accuracy of the index signal or increase the number of index signals each revolution in order to more accurately measure the actual speed of the color wheel. These methods improve the accuracy of the motor speed control, but generally drive up the display system cost due to the increased accuracy of the index marks or additional encoder hardware. They also tend to increase the required bandwidth of the color wheel control loop. In spite of the increased accuracy achieved by the addition of encoders and accurate index marks, the accuracy of the color wheel speed is limited by the resolution of the digital speed control word 212.

Unlike prior art methods of increasing the accuracy of the color wheel speed, the method and system taught herein foresee using the commutation signals from the motor control circuit 204 as an interrupt to dither the speed signal written into the motor control circuit 204. The average of the dithered signal represents the desired color wheel speed more accurately than the resolution of the digital speed control word 212 would otherwise allow.

The display system controller 202 accurately measures the input signal's frame rate and filters the input signal's frame rate to determine the proper rate at which to spin the color wheel. The result of the measuring and filtering operations is digital speed control word 212 with higher resolution that the motor control circuit is able to receive or provide. In prior art systems the lower order bits of the digital speed control word 212 were simply truncated leaving a digital speed control word 212 that matched the maximum resolution of the motor control circuit 204.

The instant invention provides a method of using the higher resolution digital speed control word 212 without upgrading the resolution of the motor control circuit. The disclosed invention uses feedback signals from the motor control circuit that occur several times each revolution to force an update of the digital speed control word 212. The periodically updated digital speed control word 212 is manipulated to ensure the average digital speed control word value represents the desired speed of the motor.

The most common feedback signal available from the motor 206 is the commutation pulse. The commutation pulse generated by the motor circuit 204 is the preferred signal by which to update the digital speed control word 212. Other signals that represent the position of the motor 206, such as a series of index signals generated one or more encoders 208 could be used instead. Likewise, a hardware timer in the display system controller 202 could also be used to periodically force the update of the digital speed control word 212.

A commutation pulse occurs half as many times per revolution as the color wheel motor has poles. For example, if the color wheel is driven by an eight pole motor, there will be four commutation pulses each revolution. Depending on the number of commutation pulses provided by the motor control circuit 204, a number of the internally truncated bits of the digital speed control word 212 are used to generate the dithered digital speed control words 212. If an eight pole motor is used, four commutation pulses are generated and the two most significant bits of the truncated portion of the motor speed word are used to dither the digital speed control word 212.

The digital speed control word 212 can be dithered in many ways. The intent of the dithering is to create a digital speed control word 212 that changes as often as each commutation pulse and has an average value that most closely represents the value of the calculated desired speed value before truncation. Table 1 shows a 16-bit desired speed value that provides the digital speed control word 212. The most significant 8 bits of the 16-bit desired speed value are used as the digital speed control word 212. The remaining 8 bits are not used in prior art systems.

TABLE 1

| Desired Speed Value | | | | | | | | | | | | | | | |
|---|---|---|---|---|---|---|---|---|---|---|---|---|---|---|---|
| Most Significant Byte | | | | | | | | Least Significant Byte | | | | | | | |
| b15 | b14 | b13 | b12 | b11 | b10 | b9 | b8 | b7 | b6 | b5 | b4 | b3 | b2 | b1 | b0 |
| Digital Speed Control Word | | | | | | | | Fractional Bits | | | | | | | |

The disclosed invention uses some of the bits, depending on the number of commutation pulses provided by the motor control circuit, to dither the digital speed control word. Table 2 shows one possible dithers scheme that uses the two most significant fractional bits to increase the digital speed control word 212 by one bit during some of the commutation interrupt periods. When neither of the two most significant fractional bits are true, the digital speed control word is not increased during any of the commutation interrupt periods.

TABLE 2

| Two-Bit Dithering Scheme | | | | | |
|---|---|---|---|---|---|
| Fractional Bits b7:6 | Commutation Interrupt 0 | Commutation Interrupt 1 | Commutation Interrupt 2 | Commutation Interrupt 3 | Fractional Value |
| 0:0 | +0 | +0 | +0 | +0 | +0.00 |
| 0:1 | +1 | +0 | +0 | +0 | +0.25 |
| 1:0 | +1 | +0 | +1 | +0 | +0.50 |
| 1:1 | +1 | +1 | +1 | +0 | +0.25 |

When the most significant fractional bit is true, the digital speed control word is increased during half of the commutation interrupt periods. When the next most significant fractional bit is true, the digital speed control word is increased during half of the remaining commutation interrupt periods. This process continues until a fractional bit only changes the digital speed control word during one commutation interrupt period.

For example, if the calculated digital speed control word is a decimal 218, the most significant fractional bit is true, and the second most significant fractional bit is false, a digital speed control word of 219 is written to the motor control circuit 204 after communication interrupt 0 and 2, and a digital speed control word of 218 is written after interrupts 1 and 3.

Table 3 is an example using only one fractional bit and a four pole motor, and Table 4 is an example using three fractional bits and a 16 pole motor. Alternate patterns reduce the number of fractional bits used by either repeating the dithering pattern or by only using some of the available commutation interrupts.

TABLE 3

Three-Bit Dithering Scheme

| b7:5 | Comm. Int. 0 | Comm. Int. 1 | Comm. Int. 2 | Comm. Int. 3 | Comm. Int. 4 | Comm. Int. 5 | Comm. Int. 6 | Comm. Int. 7 | Avg. Value |
|---|---|---|---|---|---|---|---|---|---|
| 0:0:0 | +0 | +0 | +0 | +0 | +0 | +0 | +0 | +0 | +0.000 |
| 0:0:1 | +1 | +0 | +0 | +0 | +0 | +0 | +0 | +0 | +0.125 |
| 0:1:0 | +1 | +0 | +0 | +0 | +1 | +0 | +0 | +0 | +0.250 |
| 0:1:1 | +1 | +0 | +1 | +0 | +1 | +0 | +0 | +0 | +0.375 |
| 1:0:0 | +1 | +0 | +1 | +0 | +1 | +0 | +1 | +0 | +0.500 |
| 1:0:1 | +1 | +1 | +1 | +0 | +1 | +0 | +1 | +0 | +0.625 |
| 1:1:0 | +1 | +1 | +1 | +0 | +1 | +1 | +1 | +0 | +0.750 |
| 1:1:1 | +1 | +1 | +1 | +1 | +1 | +1 | +1 | +0 | +0.875 |

TABLE 4

One-Bit Dithering Scheme

| Fractional Bit b7 | Commutation Interrupt 0 | Commutation Interrupt 1 | Average Value |
|---|---|---|---|
| 0 | +0 | +0 | +0.0 |
| 1 | +1 | +0 | +0.5 |

The motor control resolution enhancement described above increases the effective resolution of the motor controller speed command word. This in turn increases the accuracy of the control loop and the frequency and phase stability. The increased resolution is provided at no additional hardware cost through relatively simple software control and uses minimal microcontroller resources.

Thus, although there has been disclosed to this point a particular embodiment for a method and system for sequential color recapture, it is not intended that such specific references be considered as limitations upon the scope of this invention except insofar as set forth in the following claims. Furthermore, having described the invention in connection with certain specific embodiments thereof, it is to be understood that further modifications may now suggest themselves to those skilled in the art, it is intended to cover all such modifications as fall within the scope of the appended claims.

What is claimed is:

1. A display system comprising:
   a light source for producing a beam of white light along a first light path;
   a filter wheel on said first light path for filtering said beam of white light;
   a motor connected to said filter wheel for spinning said filter wheel;
   a motor control circuit electrically connected to said motor for receiving a digital speed control word and driving said motor;
   a spatial light modulator on said first light path for receiving said filtered beam of light traveling along said first path and selectively modulating said filtered beam of light traveling along said first path to form an image; and
   a controller for providing image data to said spatial light modulator and said digital speed control word to said motor control circuit, wherein said digital speed control word is dithered at least twice each revolution of said motor.

2. The display system of claim 1, said motor control circuit providing commutation interrupts to said controller, wherein said controller writes a new digital speed control word to said motor control circuit each commutation interrupt.

3. The display system of claim 1, said motor control circuit providing commutation interrupts to said controller, wherein said controller writes a new digital speed control word to said motor control circuit as often as each commutation interrupt.

4. The display system of claim 1, said controller further comprising a hardware interrupt timer to generate interrupts, wherein said controller writes a new digital speed control word to said motor control circuit each interrupt.

5. The display system of claim 1, said controller further comprising a hardware interrupt timer to generate interrupts, wherein said controller writes a new digital speed control word to said motor control circuit as often as each interrupt.

6. The display system of claim 1, said controller calculating an n-bit desired motor speed word, a most significant m-bit portion of said desired motor speed word used as a base digital speed control word and the next most significant p bits used to determine a dither pattern for said digital speed control word.

7. The display system of claim 6, said dither pattern incrementing said base digital speed control word for a number of interrupt periods determined by the binary value represented by said p bits.

8. The display system of claim 6, said desired motor speed word having 16 bits, said digital speed control word having 8 bits, and said p bits comprising 2 bits used to determine which of four interrupt periods the digital speed control word will be incremented during.

9. A motor controller for controlling the speed of a motor, said motor control circuit comprised of:

- a motor control circuit electrically connected to said motor for receiving a digital speed control word representing a desired motor speed and driving said motor;
- a controller connected to said motor control circuit for providing said digital speed control word to said motor control circuit, said controller dithering said digital speed control word at least twice each revolution of said motor.

10. The motor controller of claim 9, said motor control circuit providing commutation interrupts to said controller, wherein said controller writes a new digital speed control word to said motor control circuit each commutation interrupt.

11. The motor controller of claim 9, said motor control circuit providing commutation interrupts to said controller, wherein said controller writes a new digital speed control word to said motor control circuit as often as each commutation interrupt.

12. The motor controller of claim 9, said controller further comprising a hardware interrupt timer to generate interrupts, wherein said controller writes a new digital speed control word to said motor control circuit each interrupt.

13. The motor controller of claim 9, said controller further comprising a hardware interrupt timer to generate interrupts, wherein said controller writes a new digital speed control word to said motor control circuit as often as each interrupt.

14. The motor controller of claim 9, said controller calculating an n-bit desired motor speed word, a most significant m-bit portion of said desired motor speed word used as a base digital speed control word and the next most significant p bits used to determine a dither pattern for said digital speed control word.

15. The motor controller of claim 14, said dither pattern incrementing said base digital speed control word for a number of interrupt periods determined by the binary value represented by said p bits.

16. The motor controller of claim 14, said desired motor speed word having 16 bits, said digital speed control word having 8 bits, and said p bits comprising 2 bits used to determine which of four interrupt periods the digital speed control word will be incremented during.

* * * * *